May 21, 1957 K. D. SMITH 2,793,299
ELECTRO-OPTICAL SYSTEM
Original Filed April 5, 1944 2 Sheets-Sheet 1

INVENTOR
K. D. SMITH
BY
*Stanley B. Kent*
ATTORNEY

May 21, 1957  K. D. SMITH  2,793,299
ELECTRO-OPTICAL SYSTEM
Original Filed April 5, 1944  2 Sheets-Sheet 2
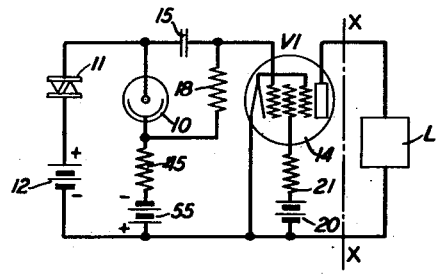
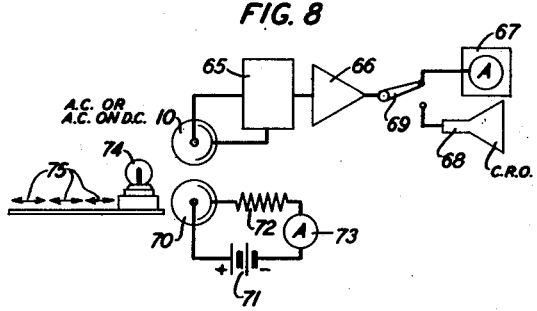
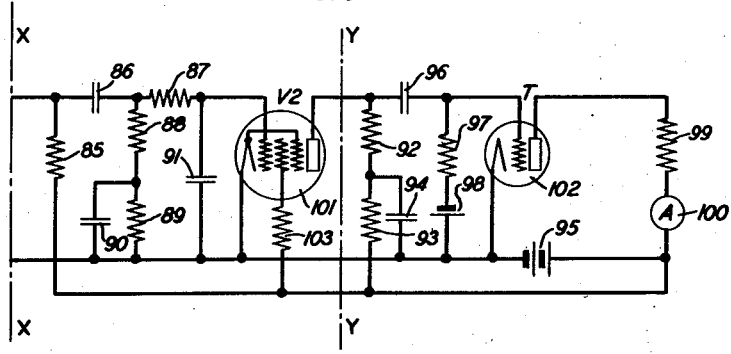
INVENTOR
K. D. SMITH
BY
Stanley B. Kent.
ATTORNEY

United States Patent Office 2,793,299
Patented May 21, 1957

2,793,299

ELECTRO-OPTICAL SYSTEM

Kenneth D. Smith, White Plains, N. Y., assignor to Bell Telephone Laboratories, Incorporated, New York, N. Y., a corporation of New York Original application April 5, 1944, Serial No. 529,639. Divided and this application August 3, 1945, Serial No. 608,702

8 Claims. (Cl. 250—214)

This invention relates to transducer systems and more particularly to electro-optical systems.

This application is a division of application Serial No. 529,639, filed April 5, 1944, for Electro-optical System.

An object of the invention is to provide an improved transducer system, for example, an electro-optical system, having a nearly constant percentage sensitivity, that is, a system in which the output voltage is nearly proportional to the percentage modulation of a modulated static condition but is independent of the magnitude of the static condition.

In order to attain this object, one or more non-linear resistive elements in a series circuit with a light sensitive electric device are used to control an amplifier which is variably biased in accordance with the current in the series circuit under different static light conditions. In an example of practice of this invention a vacuum tube amplifier which is condenser-coupled across one or more of the elements of a circuit comprising a photoelectric cell, a source of direct current, a varistor and a fixed resistor connected in series is biased by means of a conductive coupling to said fixed resistor whereby the voltage drop across said resistor is used to bias said amplifier. The bias of the amplifier in this arrangement is dependent upon the current in the series circuit under different static light conditions, the amount of the change in bias being proportional to the change in static light according to this invention.

Other illustrative embodiments of this invention will be described hereinafter.

A varistor, as the term is used herein, is a non-linear resistance device which may assume a variety of forms but is always a conductive or semiconductive device, never an electron emissive device. Varistor elements suitable for use in embodiments of this invention are discs of a semiceramic material composed of silicon carbide, clay and carbon pressed and fired. A characteristic of such a device is that the resistance is a non-linear function of the current flowing in the device. The impedance at any given voltage is inversely proportional to the area of the disc. Therefore almost any desired operating impedance may be realized by a choice of area of the varistor disc. This type of varistor, its composition and method of manufacture, are described in McEachron Patent 1,822,742, issued September 8, 1931.

One use to which this invention is adapted is to detonate the explosive charge of a projectile as it moves in proximity to a target due to a reduction in the illumination of the photoelectric cell. The normal or static illumination may be large or small, but for any given percentage reduction in the illumination the sensitivity remains practically constant. Thus, as the projectile moves past the target, which may be an airplane, a certain percentage of the illumination of the photoelectric cell is cut off at a given rate dependent upon the speed of the projectile and the nature of the airplane. However, the sensitivity of the detonating unit remains reasonably constant no matter what the absolute intensity of the illumination may be.

Another use for this invention is the measurement of percentage modulation of a light beam for a wide range of values of static light. In any arrangement where the change in output voltage is constant for a given percentage reduction in light, anywhere within the working range of light variation, that arrangement may be used to measure percentage modulation within that light range by utilizing a peak-to-peak meter energized by the alternating current component of the voltage produced by energizing the photoelectric cell with modulated light and calibrated in terms of percentage modulation. For light modulated at any constant percentage the reading of the meter would remain constant for all average values of light within the operating range of light values. However, the meter reading would change if the percentage modulation of the light were changed.

A similar arrangement comprising a peak-to-peak meter may be utilized to indicate how nearly various arrangements of photoelectric cells, varistors and biasing resistors produce voltages which are proportional to the percentage modulation of the static light at various values of static light. For this purpose the percentage modulation is kept constant while the average value of the light is changed, changes in meter reading indicating departure from constant voltage response.

For best results, the peak-to-peak meter should be a vacuum tube meter which indicates peak-to-peak values of the impressed voltage for any wave shape of the impressed voltage. A cathode ray oscilloscope properly calibrated may be used as the indicating instrument. One source of modulated light is an ordinary filamentary electric lamp energized by 60 cycles alternating current. The percentage modulation of such a light may be varied by energizing the lamp with superimposed alternating current and direct current and varying the relative voltages of each. Many other sources of modulated light are known.

This invention will now be described more in detail having reference to the accompanying drawings:

Figs. 3 to 7 are modified circuits embodying the invention;

Fig. 8 is a diagrammatic illustration of an arrangement for determining the modulation of a source of light or the effectiveness of the circuits of Figs. 1 to 7 and modifications thereof; and Fig. 9 illustrates other load circuits suitable for use with the circuits of Figs. 1 to 7 and modifications thereof.

The same reference characters are used to indicate identical elements in the several figures of the drawings.

Figure 1:
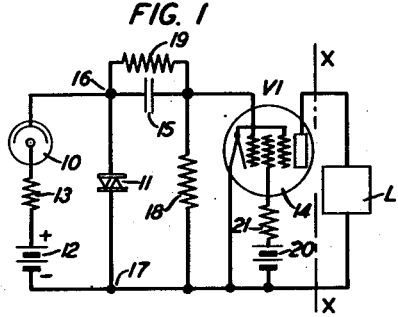
Fig. 1 is a circuit embodying the invention of the parent application in which the control electrode of a pentode amplifier is variably biased by the static voltage across a varistor by means of a high resistance connected between the grid and one terminal of the varistor in shunt of the coupling condenser.

Referring now to Fig. 1, a photoelectric cell 10, a varistor 11, a battery 12 and a protective resistor 13 are connected together to form a closed series circuit. Coupled across the varistor 11 is an amplifier stage V1 to which amplifier stage is connected a load circuit L. The amplifier V1 comprises a pentode vacuum tube 14, the control grid of which is connected through a condenser 15 to terminal 16 of varistor 11. The cathode of pentode 14 is connected to the other terminal 17 of varistor 11. Connected between the grid and cathode of pentode 14 is a grid leak resistor 18. In order to provide a variable bias voltage for the control grid of pentode 14, a resistor 19 of relatively high resistance is connected between the control grid of pentode 14 and the terminal 16 of varistor 11. This bias voltage is proportitonal to the voltage drop across varistor 11 which in turn is a non-linear function of the illumination of the photoelectric cell 10. The screen grid of pentode 14 is energized by battery 20 through resistor 21. The load circuit L is connected between the plate and cathode of pentode 14.

If the voltage versus current characteristic of varistor 11 were exactly logarithmic and the amplifier stage V1 were exactly linear over the working range of illumination of the cell 10, the response obtained in the load circuit L for any given percentage change in illumination would remain constant for all values of static light within the working range without resorting to means to provide a variable bias such as the resistor 19 of Fig. 1. However, such circuit elements may be expensive or difficult to obtain so that a very real advantage results in the use of resistor 19 with varistor 11 and vacuum tube 14 which in themselves do not give the desired response.

In the circuit of Fig. 1, it should be noted that the input circuit of the amplifier stage V1 is coupled to the photoelectric cell and varistor series circuit by two paths, namely, an alternating current path through condenser 15 and a direct current path through resistor 19. Such coupling is characteristic of the inventions of both the parent and this appplication. The voltage supplied through the direct current path changes the impedance of the space path between the control grid and cathode, at least for some light values within the working range, so that the variation in output current or voltage is substantially constant for any given percentage change in illumination within the working range of light values. However, the biasing voltage supplied through the direct current path may be used to modify the response in any other manner desired.

Figure 2:
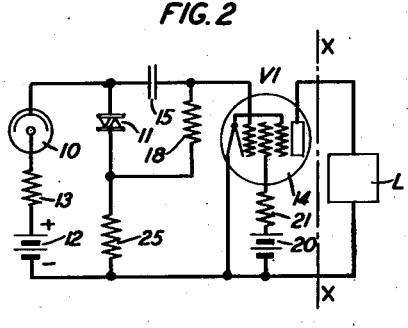
Fig. 2 is a circuit embodying the invention of this application in which the control electrode of a pentode amplifier is variably biased by the static voltage across a fixed resistor connected in series with a photoelectric cell and a varistor.

In the arrangement of Fig. 2 a resistor 25 is connected in series with the varistor 11 and the voltage drop across resistor 25 is impressed through grid leak resistor 18 on the grid of pentode 14 according to this invention. The voltage drop across resistor 25 is proportional to the illumination of photoelectric cell 10. The resistance of resistor 25 is so chosen that in cooperation with the variable impedance of the control grid to cathode space of pentode 14 it will compensate for the departure of the voltage drop across the varistor 11 from a logarithmic variation with respect to photoelectric current or illumination.

Figure 3:
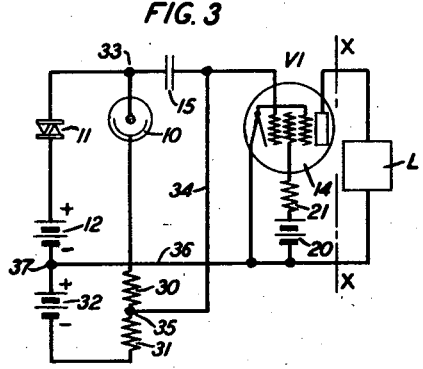

In the arrangement of Fig. 3 the series circuit, comprising photoelectric cell 10, varistor 11 and battery 12, includes additional resistors 30 and 31 and a biasing battery 32. The control grid of pentode 14 is connected through condenser 15 to terminal 33 of photoelectric cell 10, the condenser 15 constituting an alternating current path between the photoelectric cell and varistor series circuit and the amplifier V1. The resistor 31 functions both as a grid leak for pentode 14 and as a source of variable biasing voltage by reason of the direct conductive connection 34 between terminal 35 of resistor 31 and the control grid of pentode 14. A direct conductive connection 36 connects the cathode of pentode 14 to the terminal 37 of battery 32. The connection 34 from the grid of pentode 14 to the terminal 35 is a direct current path from amplifier V1 to the photoelectric cell and varistor series circuit. The voltage drop across photoelectric cell 10 and resistor 30 is impressed on amplifier V1 through condenser 15. The resistor 30 modifies the voltage impressed on amplifier V1 by way of the alternating current path through condenser 15. By properly selecting the circuit elements in Fig. 3 any desired relationship may be obtained between light on the photoelectric cell 10 and current in the load circuit L. In this arrangement the biasing battery 32 aids the battery 12 in energizing the series circuit comprising the photoelectric cell 10 and varistor 11.

Figure 4:
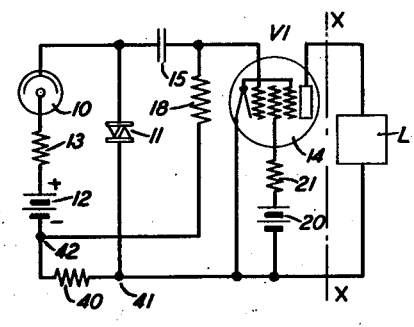

In the arrangement of Fig. 4 the amplifier V1 for alternating current is connected across the varistor 11 as in Fig. 1. For the direct current coupling the resistor 40 is inserted in the series circuit between the terminal 41 of varistor 11 and the negative terminal 42 of battery 12. The control grid of pentode 14 is connected through grid leak resistor 18 to the terminal 42 so that the voltage drop across resistor 40 places a variable negative bias on the control grid of pentode 14 with respect to the cathode of pentode 14.

Figure 5:
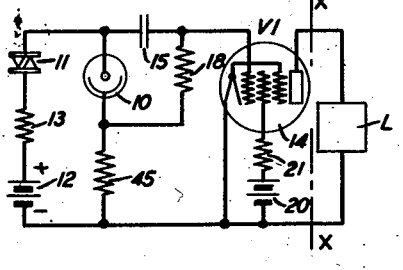

The arrangement of Fig. 5 is much like that of Fig. 2 except that the photoelectric cell 10 and the varistor 11 have been interchanged. The biasing voltage for the grid of pentode 14 is supplied by resistor 45. This biasing voltage makes the grid positive with respect to the cathode and so changes the impedance in accordance with the current through the photoelectric cell 10.

Figure 6:
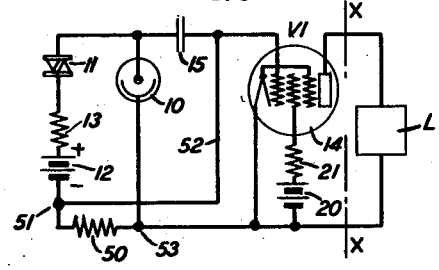

In the arrangement of Fig. 6 the voltage drop across resistor 50 places a variable negative bias on the control grid of pentode 14 with respect to its cathode. The control grid of pentode 14 is conductively connected directly to terminal 51 of resistor 50 by conductor 52. The cathode of pentode 14 is connected to the terminal 53 of resistor 50. In this arrangement the voltage drop across the photoelectric cell 10 is impressed on the amplifier V1 through the alternating current path by way of condenser 15 and the variable biasing potential through the direct current path by way of conductor 52.

The arrangement of Fig. 7 is like that of Fig. 5 except that a biasing battery 55 is connected between the resistor 45 and the battery 12. Battery 55 aids the battery 12 with respect to the series circuit including the photoelectric cell 10 and varistor 11 but opposes the voltage drop across resistor 45 in determining the bias on the control grid of pentode 14. The battery 55 and resistor 45 may be so chosen as to cause grid current to flow for light values within only a portion of the range of working light values to control the impedance of the grid to cathode path of the pentode 14.

In the arrangements of Figs. 1 to 7, the resistors 19, 25, 30, 31, 40, 45 and 50 which provide a variable bias for the control grid of pentode 14 may be varistors under some conditions instead of fixed resistors according to this invention. The response to be attained will determine the kind of varistor to be used.

An arrangement for utilizing the circuits of Figs. 1 to 7 and the modifications thereof noted above is illustrated in Fig. 8. Box 65 and photoelectric cell 10 represent an arrangement like any one of those illustrated in Figs. 1 to 7 to the left of the line X—X. An audio amplifier 66 is connected as load in place of the load L to the right of line X—X in Figs. 1 to 7. A peak-to-peak voltmeter 67, the readings of which are indicated on an ammeter A or a cathode ray oscillograph 68, may be connected alternatively to the output of amplifier 66 by switch 69. A second photoelectric cell 70 is connected in series with a battery 71 and resistor 72 to a microammeter 73 the reading of which gives a measure of the average illumination of photoelectric cell 70. Photoelectric cells 10 and 70 are equally illuminated by light from an incandescent filament lamp 74 which may be positioned at different distances from the cells 10 and 70 as indicated by the double-headed arrows 75. The filament may be energized by 60 cycles alternating current or by 60 cycles alternating current superposed on direct current. The light produced by either type of energization is a modulated light, that is, a light of some average value varying cyclically in accordance with the wave shape of the energizing current.

The arrangement of Fig. 8 may be used in two ways, namely, first to determine the characteristic of the circuit represented by block 65 and, second, to determine the percentage modulation of the light from lamp 74. When the circuit represented by the block 65 has such a characteristic that for equal percentage changes in the illumination of photoelectric cell 10 equal changes in output voltage result as indicated by meter A, assuming, of course, that the illumination falls within the working range of the illuminations of the arrangement, the meter A may be calibrated in terms of percentage modulation of the light and will show the percentage modulation of light from any source of light whether it be lamp 74 or some other source such as a lamp used for lighting a room or even daylight.

The circuit of Fig. 9 is another load circuit which may be substituted for the load L in any of the arrangements of Figs. 1 to 7 and modifications thereof. It comprises an amplifier stage V2 adapted to be connected to amplifier stage V1 of any of the arrangements of Figs. 1 to 7 and a thyratron stage T coupled to the output circuit of amplifier stage V2. The output circuit of amplifier stage V1 is coupled to the input circuit of amplifier stage V2 by resistor 85, series condenser 86, series grid resistor 87, grid leak resistors 88 and 89, shunting condenser 90 for resistor 89 and shunt grid condenser 91. The output circuit of amplifier stage V2 is coupled to the input circuit of thyratron stage T by resistors 92 and 93, condenser 94 shunting resistor 93 and battery 95, series condenser 96, grid leak resistor 97 and negative biasing grid battery 98. The output circuit of thyratron stage T comprises load resistor 99 in series with ammeter 100 and battery 95. Amplifier stage V2 includes a pentode vacuum tube 101 and thyratron stage T, a thyratron tube 102. The cathodes of tubes 14 and 101 and thyratron tube 102 are heated by current from a battery, not shown. The screen grid of pentode 101 is energized from battery 95 through resistor 103.

The portion of Fig. 9 to the right of line X—X may be connected to the portion to the left of the line X—X in any of Figs. 1 to 7 to form various useful arrangements. Also in Fig. 9 the portion to the right of line Y—Y may be connected to the portion to the left of line X—X in any of Figs. 1 to 7 to form other useful arrangements. For example, if the portion of Fig. 9 to the right of line Y—Y is used with the portion to the left of line X—X of Fig. 1, an arrangement results which can be used to detonate the explosive charge of a projectile as it moves into proximity to a target whereby the illumination of the photoelectric cell 10 is impulsively reduced. The reduction of light on the photoelectric cell 10 causes the grid of thyratron 102 to become less negative until the thyratron fires to heat the resistor 99. On the other hand, if the portion of Fig. 9 to the right of line X—X is used with the portion to the left of the line X—X of Fig. 1, an arrangement results in which an impulsive increase in the illumination of photoelectric cell 10 is necessary to fire the thyratron.

As an aid in practicing this invention certain data with respect to varistor 11 will now be given. These data are merely illustrative. Varistor 11 is a non-linear resistor element made up of silicon carbide, clay and graphite after the manner disclosed in McEachron Patent 1,822,742. The ingredients are granulated and thoroughly mixed in the proportions of 60 parts of silicon carbide, 40 parts of clay, and one part of graphite. After wetting with water and being partially dried this material is pressed into discs and fired. Each disc has an outside diameter of ¾ of an inch, a thickness of .030 of an ich, and a central hole 9/32 of an inch in diameter. The faces only of each disc are coated with tin with a metallizing gun. Each complete disc has such a resistance that 20 volts applied between the tin coated faces produce current of between 10 and 3.3 milliamperes, and 10 volts applied in the same manner produce not less than 0.21 milliampere. This varistor is formed by dividing one disc into ten equal sectors and clamping five sectors face to face between copper electrodes. The resistance of this unit at one microampere is 22 megohms.

What is claimed is:

1. An electro-optical system comprising a photoelectric cell, a vacuum tube amplifier having a cathode, an anode and a control electrode, an input circuit for said amplifier including said cathode and control electrode, an output circuit for said amplifier including said cathode and anode, a coupling circuit for transmitting alternating current components only between said photoelectric cell and said input circuit including a varistor, means to change the direct current bias on said control electrode with respect to said cathode by amounts proportional to the changes in current flowing through said cell due to changes in the illumination of said cell, and a load circuit connected to the output circuit of said amplifier.

2. An electro-optical system comprising a photoelectric cell, a vacuum tube amplifier having a cathode, an anode and a control electrode, an input circuit for said amplifier including said cathode and control electrode, an output circuit for said amplifier including said cathode and anode, a coupling circuit for transmitting alternating current components only between said photoelectric cell and said input circuit including a varistor, means to change the direct current bias on said control electrode with respect to said cathode by amounts proportional to the changes in current flowing through said cell due to changes in the illumination of said cell, means to measure the peak-to-peak voltage of the alternating current component of the electric current produced by the said illumination of said photoelectric cell, and means to measure the average value of the illumination of said cell in terms of voltage units corresponding to said peak-to-peak voltage units.

3. An electro-optical system including a primary closed series circuit comprising a light sensitive electric device, a varistor and a source of direct current, means for amplifying electrical energy comprising a bias element and another element, the bias of which bias element with respect to said other element of said amplifying means changes the amplifying ability of said amplifying means, a circuit for transmitting alternating current components only coupling said amplifying means to said primary circuit, a conductive connection between said other element of said amplifying means and a first point of said primary circuit, a second conductive connection between said bias element and a second point of said primary circuit which is always negative with respect to said first point.

4. An electro-optical system including a primary closed series circuit comprising a light sensitive electric device, a varistor and a source of direct current, means for amplifying electrical energy comprising a bias element and another element, the bias of which bias element with respect to said other element of said amplifying means changes the amplifying ability of said amplifying means, a circuit for transmitting alternating current components only coupling said amplifying means to said primary circuit, a conductive connection between said other element of said amplifying means and a first point of said primary circuit, a conductive connection between said bias element and a second point of said primary circuit, the portion of said primary circuit between said first and second points including a source of direct current with the positive terminal nearer said first point.

5. A primary closed series circuit comprising a photoelectric cell, a varistor, a plurality of resistors and a source of direct current having a voltage tap intermediate its terminals, the cell being positioned intermediate the varistor and one of said resistors and the second resistor being adjacent to the first resistor, a vacuum tube amplifier comprising a cathode, an anode and a control electrode, a condenser connected between said control electrode and the terminal of the photoelectric cell nearer the varistor, a conductive connection of low impedance from said control electrode to the terminal of the resistor adjacent to said cell which terminal is remote from the cell, a conductive connection between said tap of said source of direct current and said cathode, and a load circuit connected to said anode and cathode.

6. A primary closed series circuit comprising a photoelectric cell, a varistor, a resistor and a source of direct current, one terminal of said varistor being connected to said resistor, a vacuum tube amplifier comprising a cathode, an anode and a control electrode, a condenser connected between the terminal of said varistor remote from said resistor and said control electrode, a conductive connection from the other terminal of said varistor to said cathode, a high resistance connected between the terminal of said resistor remote from said varistor and said control electrode, and a load circuit connected to said anode and cathode.

7. A primary closed series circuit comprising a photoelectric cell, a varistor, a resistor and a source of direct current, one terminal of said photoelectric cell being connected to said resistor, a vacuum tube amplifier comprising a cathode, an anode and a control electrode, a condenser connected between the terminal of said photoelectric cell remote from said resistor and said control electrode, a conductive connection between the other terminal of said photoelectric cell and said cathode, another conductive connection between the terminal of said resistor remote from said photoelectric cell and said control electrode, and a load circuit connected to said anode and cathode.

8. A primary closed series circuit comprising a photoelectric cell, a varistor, a resistor, and a source of direct current, one terminal of said photoelectric cell being connected to said resistor and said source of direct current having a voltage tap intermediate its terminals, a vacuum tube amplifier comprising a cathode, an anode and a control electrode, a condenser connected between the terminal of said photoelectric cell which is remote from said resistor and said control electrode, a high resistance connected between the other terminal of said photoelectric cell and said control electrode, a conductive connection from said intermediate voltage tap on said battery to said cathode, and a load circuit connected to said anode and cathode.

References Cited in the file of this patent

UNITED STATES PATENTS

| | | |
|---|---|---|
| 1,415,748 | Weintraub | May 9, 1922 |
| 1,650,092 | Poulsen et al. | Nov. 22, 1927 |
| 1,864,670 | Reynolds | June 28, 1932 |
| 1,889,758 | Nakken | Dec. 6, 1932 |
| 2,219,189 | Lundstrom | Oct. 22, 1940 |
| 2,360,233 | Hussey | Oct. 10, 1944 |